United States Patent

[11] 3,602,186

[72] Inventor Charles H. Popenoe
 6307 Wiscassett Road, Bethesda, Md. 20016
[21] Appl. No. 61,764
[22] Filed Aug. 6, 1970
[45] Patented Aug. 31, 1971

[54] OPTI-MECHANICAL STRESS-STRAIN INDICATOR
 9 Claims, 6 Drawing Figs.
[52] U.S. Cl. .................................................... 116/114, 73/88, 85/62
[51] Int. Cl. .................................................... G01d 21/00
[50] Field of Search .......................................... 116/70, 114, DIG. 24; 73/1, 88 E, 88 F, 88, 85.5; 85/62

[56] References Cited
 UNITED STATES PATENTS

| | | | |
|---|---|---|---|
| 2,600,029 | 6/1952 | Stone | 85/62 X |
| 2,747,454 | 5/1956 | Bowersett | 85/62 |
| 3,137,268 | 6/1964 | Hornwood | 116/114 |
| 3,194,105 | 7/1965 | Gill | 85/62 |
| 3,220,375 | 11/1965 | Gruber et al. | 116/70 |
| 3,224,316 | 12/1965 | Grikscheit et al. | 85/62 |
| 3,248,923 | 5/1966 | Blakelet | 73/1 |

Primary Examiner—Louis J. Capozi
Attorney—Max L. Libman

ABSTRACT: A purely mechanical device for indicating the stress condition between two portions of a machine or structure, typically in the form of a threaded fastener or bolt used to fasten or connect the two points. In one form of the invention, an unstressed pin is inserted loosely in an axial bore in the bolt and fastened to it at one end; the free end of the pin terminates in an indicator head having an exposed area, preferably brightly colored, normal to the pin axis, which area in the unstressed condition of the bolt rests flush against the transparent or translucent window set into the head of the bolt, and the space surrounding the pin and head is filled with a preferably dark fluid which absorbs the color of the exposed indicator area. When stress is applied between the ends of the bolt, as by tightening it, the indicator head of the unstressed pin is retracted away from the window, and the colored fluid enters behind the window absorbing the color of the indicator area at a predetermined stress, and causing an apparent change of color of the indicator window. If the bolt later becomes loosened, the indicator window reverts to its original bright color, providing a warning of the looseness.

PATENTED AUG 31 1971 3,602,186
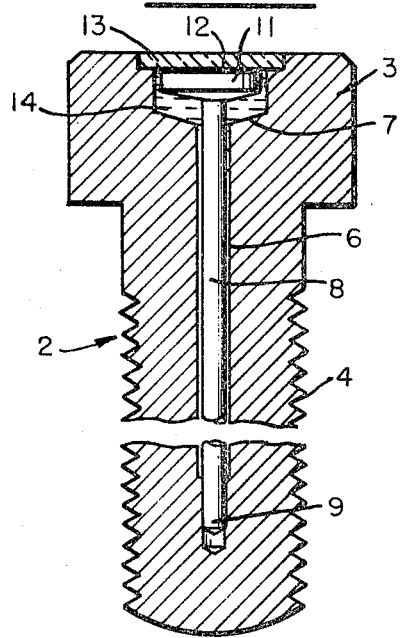
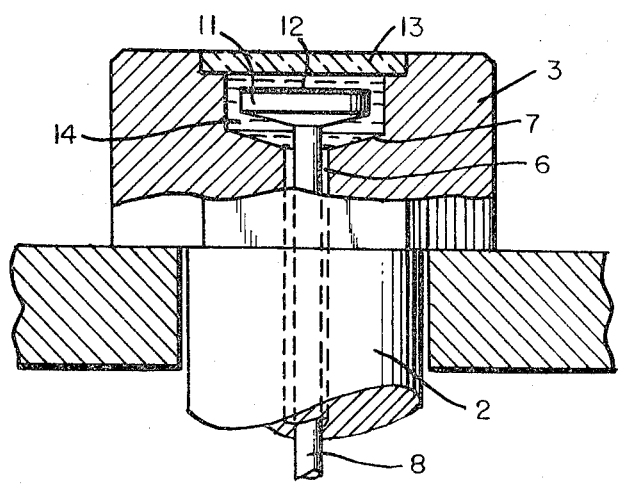
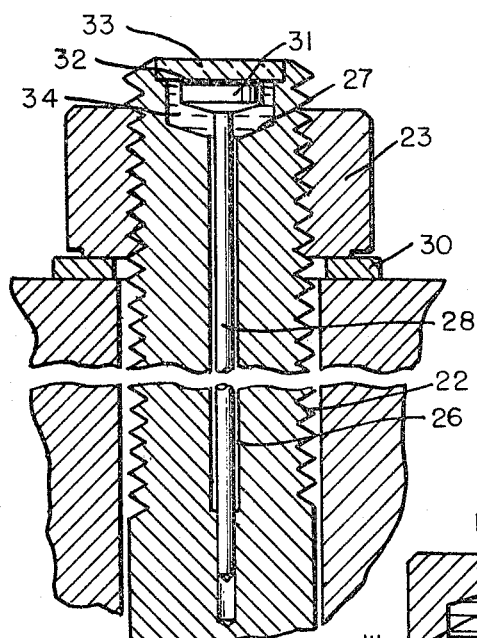
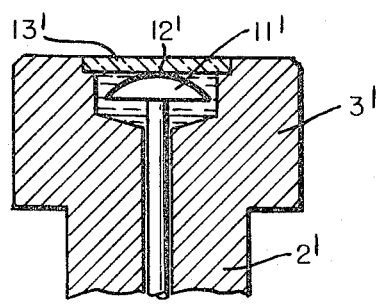
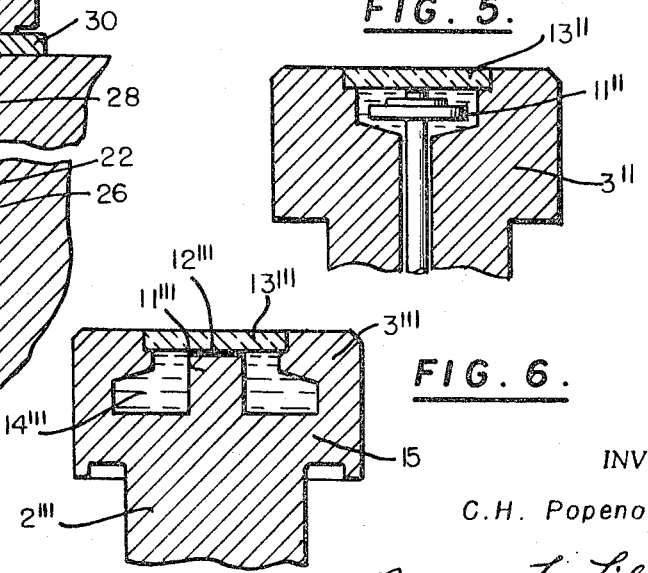
INVENTOR
C.H. Popenoe
BY Max L. Libman
ATTORNEY

OPTI-MECHANICAL STRESS-STRAIN INDICATOR

The present invention relates to a family of fasteners in which the stress or strain placed on the fastener is made obvious to a visual inspection. One purpose of the invention is to provide a means of tightening a fastener to a prescribed stress without requirement for any instrument such as a torque wrench. An additional object is to provide a stress indicator in which a color change in an indicator window occurs at a predetermined stress in the body of the device. Thus, if the stress on the device is later relaxed, it is made obvious to a visual inspection or to automatic inspection equipment because of a reversion to the original color.

In a preferred form of the invention, an unstressed pin is inserted in a small diameter hole placed axially in the fastener, and fastened at one end while free to move relative to the stressed fastener body at the other end. According to Hooke's Law, the differential movement of the free pin end is equal to the applied stress divided by the elastic modulus. For steel, the relative movement will be approximately 0.001 inch for each 30,000 p.s.i. applied stress per inch of pin length. Thus, a 1-inch long bolt tightened to 60,000 p.s.i. will elongate approximately 0.002 inch. The main embodiment of the invention relates to a means for inexpensively and simply measuring and indicating this small elongation.

In accordance with the invention, the free end of the unstressed pin has an indicator area, typically in the form of a disc attached to the pin so that the plane of the disc is normal to the pin axis. The exposed face of the disc is preferably covered with a reflective coating in a prominent bright color such as red, orange, yellow or any other color usually associated with danger or warning. This disc is recessed into the fastener body and covered with a transparent window, and the space surrounding the pin and disc is filled with a fluid of a dark color, such as dense blue, which strongly absorbs the wavelength of light reflected by the pin head covering. The window is preferably recessed and is in flush contact with the pin head when the fastener is in the unstressed condition. The film of fluid between the window inside surface and the pin head is very thin or negligible in this condition and the color of the head is reflected strongly through the window. When a stress is applied as by tightening the fastener, the head of the unstressed pin is retracted away from the transparent window, increasing the thickness of the absorbing fluid layer between the colored head and the window, until this layer becomes opaque to the head color at the proper tension. By this means a dramatic color change, e.g., from bright red orange to dark blue, occurs, which, as long as the elastic limit of the fastener is not exceeded, is completely reversible, and if the fastener becomes loosened, the bright color of the unstressed pin head immediately becomes visible again, thereby providing warning of the looseness.

The point at which the color change occurs can be calibrated by varying the density of the absorbing material in the fluid. In this way, fasteners can be made which exhibit the color change at any reasonable value of applied stress. Tests of such fasteners have shown the color change to be reproducible to some 10 percent in terms of applied torque as measured by a torque wrench.

The specific nature of the invention, as well as other objects and advantages thereof, will clearly appear from a description of a preferred embodiment as shown in the accompanying drawing, in which:

FIG. 1 is a longitudinal sectional view of a threaded bolt embodying the invention, in the unstressed condition;

FIG. 2 is a sectional view of the head of the same bolt in the stressed condition, showing the manner in which the indicator fluid becomes visible;

FIG. 3 is a transverse sectional view of a stud embodying the invention;

FIG. 4 is a transverse sectional view of the head of a bolt embodying a modified form of the invention;

FIG. 5 is a view similar to FIG. 4 of still another modification; and

FIG. 6 is a view similar to FIG. 4 of still another modification, in which the invention measures not the elongation of the shank of the fastener, but instead the deflection of a part of the head structure. Referring to FIg. 1, the invention is shown embodied in a bolt 2 having a head 3, usually in the form of a square or hexagon so that it may be turned with a wrench, the body of the bolt being threaded as shown at 4, for insertion into the threaded hole of a member to be fastened, or alternatively for use with a nut to fasten two mechanical members together in known fashion. An axial bore 6 is drilled from the head of the bolt to a point near the thread end of the bolt and is countersunk as shown at 7 to provide a larger bore near the head end. A loosely fitting pin 8 is inserted into the bore 6, and fastened to the bolt at the blind end 9, in any desired fashion, preferably by means of a friction fit into a small diameter section of the axial bore 6 at its blind end. The head end of the pin 8 terminates in a disc 11 having a face or indicating area 12 which is preferably provided with a highly visible coating of a bright color, such as red-orange. A window 13 of glass, plastic, or any other suitably transparent or translucent material is fixed to the visible face of the bolt head 3, preferably by being inserted flush with the surface as shown in FIG. 1, although it could also be adhered to the top face of the bolt, in which case the pin head would be made extended so that the covered surface 12 in any case rests flush against and in close contact with the inside surface of the window 13. Prior to insertion of the window, the free space between the pin 8 and the wall of axial bore 6 is substantially filled with a light-absorbing fluid 14 of a different color from that of the surface 12, for example a dense blue of black fluid. The fluid should not be such as tends to stain or color the contacting surfaces of window 13 and indicator area 12, so that when these two surfaces are in close contact, the fluid is substantially all displaced from between them, so that it is not visible. However, as explained above, when the nut is used to fasten two mechanical members together, as it is tightened with a wrench, the bolt 2 will become slightly elongated due to the stress placed upon it, and since the pin 8 is not under stress, the window 13 begins to move away from the display surface 12, permitting the colored fluid in the free space to enter between the two. If the fluid is made very opaque or of very high light-absorbing power, only a very thin film of it, in the order of 0.001 inch is sufficient to suddenly and dramatically change from bright to dark the appearance of the indicator area as seen through the window 13. The stress at which the change of appearance effectively occurs can be quite well controlled by controlling the optical density or light-absorbing power of the fluid. In practice, it can be readily calibrated to be reproducible within 10 percent, which is good enough for most practical purposes.

FIG. 2 shows the bolt under stress condition, where the head 11 has moved away from window 13, permitting the fluid 14 to enter the space between the head and the window, and thus change the appearance as seen through the window 13. This is, of course, greatly exaggerated in the drawing for the sake of visibility, as the actual movement is usually less than 0.002 inch.

FIG. 3 shows a slight modification of the invention, where it is applied to a stud 22, the lower end of which may be fixed to one element of a machine or structure, while another is to be fastened to it by means of a nut 23. In this case, since the threaded end is visible, the invention is applied to this end, in the same fashion as before, corresponding parts having reference numerals two decades higher than those in FIG. 1 to which they correspond, except for element 30, which indicates a conventional washer.

FIG. 4 shows a modification in which the head 11' corresponding to head 11 in FIG. 1, is made slightly rounded, so that it is in contact with the window at only one point. The degree of curvature shown is, of course, greatly exaggerated, and the actual maximum distance between the rounded head and the window at the outer rim of the head is made such that the light-absorbing liquid becomes barely visible at the beginning of the range of stress which is of interest, and as the bolt is tightened beyond this range, the apparent area of the original color of the head becomes smaller, thus giving an indication of the tension at any point as the bolt continues to be tightened.

FIG. 5 shows another modification of the same principle, in which the head 11″ is made stepped rather than smoothly curving, so that at predetermined stress or tension points, concentric circles of different size appear as the bolt is tightened; in this way it can be assured that the bolt is tightened to a degree within a given desired range so that it is neither too tight nor too loose.

In FIG. 6 the elastically deformable strain member is embodied in the web 15 in the bolt head, which deforms somewhat like a Belleville washer, instead of the elongated shank of the fastener. Tightening stress on the bolt head 3‴ deforms web 15 axially so that the indicating area 12‴ affixed to head 11‴ pulls away from the window 13‴, so that the obscuring fluid 14‴ enters the space between area 12‴ and window 13‴ changing the apparent color of the fastener head in the same manner as described in FIG. 1.

Instead of employing the invention in a bolt used to tighten two mechanical members together, it may be placed in the unstressed condition in a structure or mechanism which may be subject to excessive stresses, such as a bridge, a critical portion of an airplane wing, and so forth, being left normally in the unstressed condition. However, if the two parts become stressed to a dangerous degree, the device can be so calibrated that this will be shown by a change in color of the head as the indicator member becomes stressed due to the dangerous condition. This can therefore be revealed by visual examination at any time, without the use of additional tools or indicating devices. The same principle can, of course, be applied to mechanical models which are stress tested to determine their working limits.

I claim:

1. a. Optimechanical stress ro strain indicator comprising
   b. a first strain member and a second unstressed member fixed to each other at one point and movable relative to each other at another point when said first member is elastically deformed,
   c. said first member having a window aperture fixed thereto,
   d. said second member having an indicator area adjacent said window area and movable with respect to said window area under stress applied to said first member,
   e. a light-absorbing indicator fluid between said window area and said indicator area, the amount of said fluid visible between said two areas varying with the relative movement of said areas,
   f. means for fastening said first member near its window area to one part of a structure and near said unstressed member to another part of a structure to indicate the condition of stress or strain between said two parts.

2. a. Stress indicator comprising
   b. an elongated strain member having a axial bore therein,
   c. means for attaching the ends of said member to respective parts between which strain may occur,
   d. an elongated rodlike member loosely fitted in said axial bore,
   e. said rodlike member being fixed at one end of said axial bore to said strain member,
   f. the other end of said rodlike member having an indicator area substantially transverse to its longitudinal axis,
   g. a light-transmitting window closing the indicator-area end of said bore,
   h. said indicator area of said rodlike member in the unstressed condition of said strain member being very close to the inside of said window,
   i. a light-absorbing indicator fluid substantially filling the space in said axial bore not occupied by said rodlike member
   j. whereby when said strain member is strained by a stress between its opposing ends, the indicator-area end of the rodlike member moves away from said window, permitting the indicator fluid to enter between said window and said indicator area.

3. The invention according to claim 2, with both said indicator area and the inside surface of said window being planar and in close abutting contact.

4. The invention according to claim 2, said window having a planar interior surface, the indicator area having a slight curvature, or vice versa, so that the indicator area and window are not in contact at all points of their adjacent surfaces.

5. The invention according to claim 2, said indicator area having a number of stepped areas at slightly different distances from said window.

6. The invention according to claim 2, said elongated strain member being a threaded bolt, said window being in one end of the bolt.

7. The invention according to claim 2, said elongated strain member being a threaded stud, said window being in the threaded end of said stud.

8. The invention according to claim 1, said first member being an elastically deformable fastener head.

9. The invention according to claim 8, said head having a resilient disclike web element extending inwardly from the periphery of the head toward a central region, said second member extending from said central region toward said window.